United States Patent Office 3,554,608
Patented Jan. 12, 1971

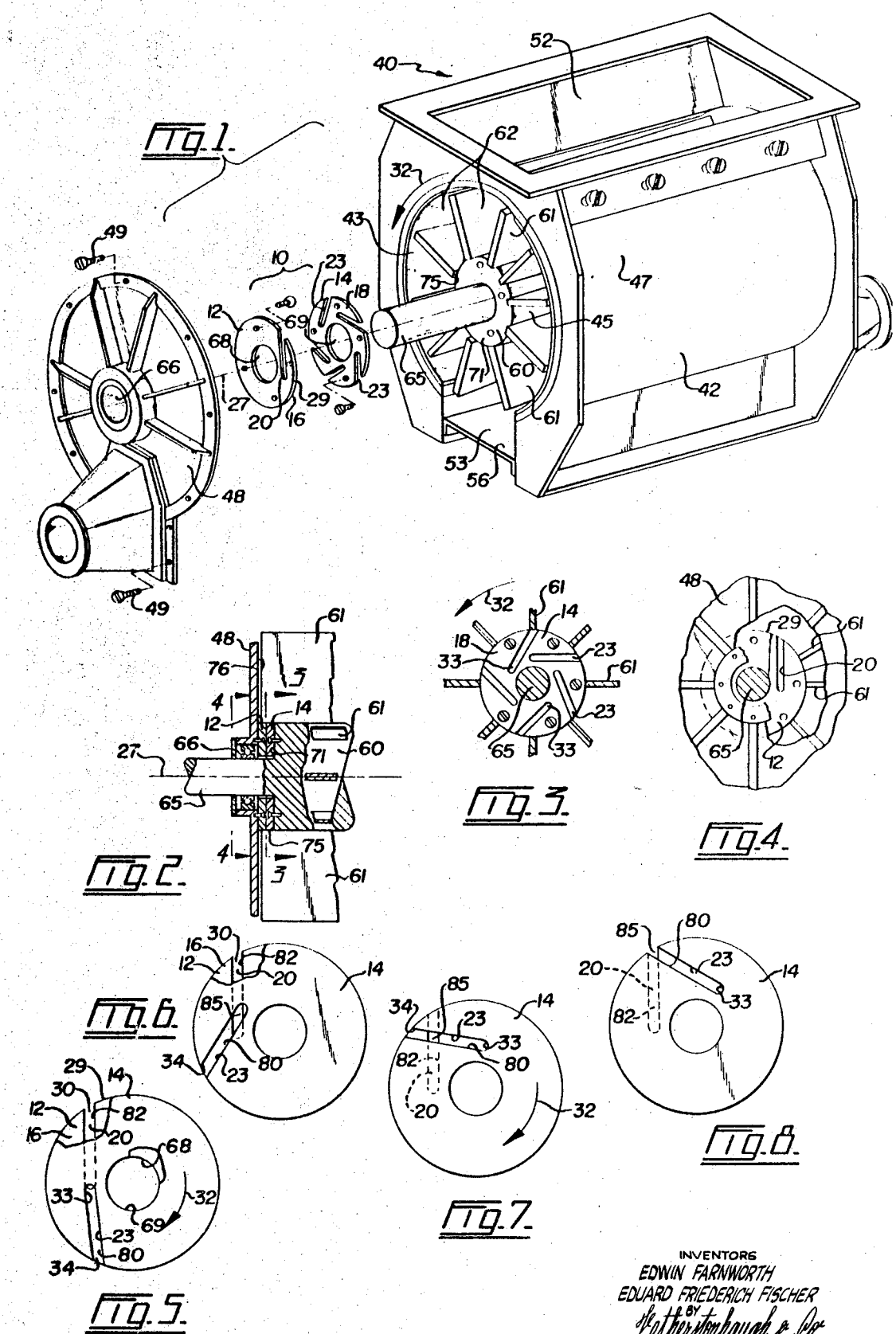

3,554,608
SCRAPER APPARATUS FOR RELATIVELY ROTATABLE SURFACE
Edwin Farnworth, 6251 Overstone Drive, West Vancouver, British Columbia, Canada, and Eduard Friedrich Fischer, 430 Somerset Crescent, North Vancouver, British Columbia, Canada
Filed Mar. 27, 1967, Ser. No. 805,389
Int. Cl. B65g 53/40
U.S. Cl. 302—49
14 Claims

ABSTRACT OF THE DISCLOSURE

Scraper apparatus for equipment liable to have foreign matter lodge between relatively rotatable surfaces therein, such as rotary air-lock feeders for directing particulate material into fluid conveyor systems, said apparatus during operation of the equipment constantly scraping the relatively rotatable surfaces to gather up foreign matter tending to lodge therebetween, and ejecting the gathered matter from between said surfaces.

BACKGROUND OF THE INVENTION

This invention relates to scraper apparatus for equipment, such as rotary air-lock feeders of fluid conveyor systems, liable to have foreign matter lodge between relatively rotatable elements thereof.

Rotary feeders of the past handling particulate material were subject to the problem of fine material lodging between the hub ends of the rotors of the units and the adjacent covers on end walls. This material packed between the adjacent surfaces until the rotors jammed, and it was necessary to stop the feeders and to take them apart sufficiently to enable the packed material to be removed. This resulted during the build-up the material in a waste of power and undue wear on the relatively moving surfaces, and in a loss of operating time. These problems exist wherever two relatively rotatable parts are liable to have foreign matter lodge therebetween. The present invention continuously removes any particles that tend to lodge between the hub ends and adjacent covers of feeders, and between any other relatively rotatable elements.

SUMMARY OF THE INVENTION

The scraper apparatus includes first and second members having adjacent surfaces pressed against each other and relatively rotatable around an axis normal thereto, a groove in said surface of the first member extending outwardly to an outer edge of said first member, and a groove in said surface of the second member extending outwardly relative to said axis, one of said grooves being inclined relative to the other of said grooves. When there is relative rotation between said adjacent surfaces, foreign material tending to lodge therebetween is scraped into said grooves and forced therealong in a general radial direction to be discharged therefrom at the outer edge of the first member. As one groove moves over the other, the relative inclination thereof results in a scissors-like action that squeezes material in said grooves therealong in a radial direction.

BRIEF DESCRIPTION OF THE DRAWINGS

FIG. 1 is a partially exploded perspective view of a rotary air-lock feeder embodying this invention.
FIG. 2 is an enlarged fragmentary vertical section through an end of the feeder.
FIG. 3 is a section taken along line 3—3 of FIG. 2,
FIG. 4 is a vertical section taken along line 4—4 of FIG. 2, and
FIGS. 5 to 8 are diagrams illustrating the action of the scraper apparatus.

DESCRIPTION OF THE PREFERRED EMBODIMENTS

Referring to the drawings, 10 represents scraper apparatus in accordance with the present invention in its simplest form. Scraper apparatus 10 comprises relatively thin members or circular plates 12 and 14 which are of substantially the same size, and have adjacent surfaces 16 and 18, respectively, which are pressed together when the apparatus is in operation. While members 12 and 14 are usually flat, as shown, the adjacent surfaces 16 and 18 may be curved or otherwise formed to fit one within the other. For example, surface 16 might be concave and surface 18 convex.

Member 12 has a groove 20 formed in surface 16 thereof, while member 14 has at least one groove 23 formed in its surface 18. When members 12 and 14 are in the form of relatively thin plates, as shown, grooves 20 and 23 are slots formed therein. It is preferable to provide a plurality of grooves 23 in member 18, as clearly shown in FIG. 3, although the apparatus will function even if there is only one of these grooves.

When apparatus 10 is in operation, members 12 and 14 are arranged on a common axis of rotation 27 which extends normal thereto centrally thereof, and one member rotates relative to the other, which in this example is member 14. It will be understood that in some applications of the invention, member 12 might rotate relative to member 14, or these members may both rotate in opposite directions.

Groove 20 of member 12 extends outwardly from near the center of the member to an outer edge 29 thereof. Said groove opens throughout its length laterally from surface 18 of the member, and it opens outwardly from said member at the outer end 30 of said groove. While this groove may be arranged radially in member 12, it is preferably inclined relative to the axis of rotation 27, and in this example, it extends substantially tangentially relative to said axis. Similarly, each groove 23 of member 14 may be radially arranged, but it is preferably inclined relative to axis 27, and in the illustrated example, it extends substantially tangentially relative to said axis. The incline of each groove 23 is opposite to the incline of groove 20, and for proper operation of the apparatus, either groove 20 or each groove 23 must be inclined relative to the other. In other words, if groove 20 is radially arranged, each groove 23 should be inclined, and vice versa. During operation, member 14 rotates in the direction of arrow 32, see FIG. 3, and with this arrangement the inner ends 33 of grooves 23 move ahead of the outer ends 34 of said grooves relative to the direction of rotation of the member.

Members 12 and 14 may be placed between or incorporated into two relatively rotatable surfaces in equipment where foreign material is liable to lodge between these surfaces. Members 12 and 14 are fixedly secured to the relatively rotatable surfaces or elements and actually become part thereof, or these relatively rotatable surfaces may be constructed with the respective grooves 20 and 23 so that said surfaces or elements constitute the relatively rotatable members of the scraper apparatus.

Members 12 and 14 and their respective grooves form the basis of this invention, and the accompanying drawings illustrate a rotary air-lock feeder 40 embodying this basic concept.

Rotary feeder 40 includes a cylindrical housing 42 defining a cylindrical chamber 43 in which a rotor unit 45 is rotatably mounted. Housing 12 is formed by a cylindrical wall 47 and covers or end walls 48 at opposite ends thereof, only one of these walls being shown in FIG. 1. Each end wall 48 is secured to housing 42 in any suitable manner, such as by bolts 49. Housing 42 has an inlet 52 in the top thereof and an outlet 53 in the bottom thereof. In this example, outlet 53 communicates with a substantially U-shaped channel 56 extending along the bottom of housing 42.

Rotor unit 45 consists of a central hub 60 extending along the longitudinal axis 27 of chamber 43, and a plurality of blades 61 radiating from the hub and forming pockets 62 which open outwardly in a radial direction. A shaft 65 projecting from ends of hub 60 is journalled in bearings 66 mounted on end walls 48, and a suitable source of power, not shown, is connected to one end of the shaft in any convenient manner in order to rotate unit 45.

In this example, members or plates 12 and 14 are formed with central openings 68 and 69 therein, and said openings being just large enough to accommodate shaft 65 upon which said members are mounted. Members 12 and 14 are respectively secured to the inner surface of end wall 48 and the end surface 71 of rotor hub 60 by bolts or other suitable means so that they in effect become parts of the end wall or cover and the hub. There is a set of scraper members 12 and 14 at each end of the rotor unit, and both sets operate in the same manner.

In this example, blades 61 of rotor unit 65 extend outwardly beyond the end 72 of hub 60, as indicated at 75 in FIG. 2, to bear against the inner surface 76 of cover 48, so that members 12 and 14 are located within the inner edges of said blades. As grooves 20 and 23 open outwardly from their respective members or plates, they open into the pockets 62 of rotor 45.

During operation, rotary feeder 40 is connected in a fluid conveyor line, not shown, so that the conveying fluid moves through channel 56 and the pocket or pockets 62 of rotor unit 45 that open downwardly into said channel. The rotor unit is rotated, and particulate material, such as powders, grain, wood chips, and the like are fed into the feeder through inlet 52 and into rotor pockets 62. These pockets convey the material around chamber 43 and discharge the material into the conveying fluid travelling through channel 56.

As rotary feeders 40 handle particulate material, usually of a very fine nature, or which breaks up into fine particles, there is a tendency for the particulate material to get between the end of hub 60 and the adjacent inner surface of cover 48, and the abrasive action of the particulate material causes a great deal of wear and represents a loss of power and the feeders have to be periodically shut down and taken apart for cleaning. With members or plates 12 and 14 firmly secured to the inner surface of cover or end wall 48 and the adjacent end surface 71 of rotor hub 60, the particulate material can only get between the adjacent surfaces 16 and 18 of relatively rotatable members 12 and 14. Plates 12 and 14 are the effective inner surfaces of the end wall and the effective end surface of the rotor hub at scraper apparatus 10. As member 14 rotates over member 12, any particulate material lodging between these members is scraped into grooves 20 and 23, and eventually is discharged from the outer ends of these grooves by centrifugal force and by a scissors-like action resulting from the angular arrangement of these grooves relative to each other.

FIGS. 5 to 8 illustrate the scraping and discharging action of scraper apparatus 10. These figures illustrate the movement of one of the grooves 23 relative to groove 20. Groove 23, the moving groove in this example, has an edge 80 extending from its inner end 33, to its outer end 34, while groove 20 has an opposed edge 82 extending from its inner end to the outer end 30 thereof. The angular arrangement of grooves 20 and 23 relative to each other is such that the inner end of groove 23 first comes into registry with the inner end of groove 20, as shown in FIG. 5. As groove 23 moves over the inner surface 16 of member 12, any particulate material lodged between the two members of the scraper apparatus is trapped in the groove when the latter moves over said particles. Edge 80 of groove 23 acts as a scraper and moves particles in the groove over the surface of adjacent member 12. FIGS. 6, 7 and 8 show groove 23 progressing over and along groove 20. During this time, any particulate material in groove 23 joins any material there may be in groove 20. It will be noted that edge 81 or groove 23 slides along edge 82 of groove 20, starting at the inner end of the latter and moving towards the outer end thereof. Particulate material accumulates in the registering portions of the two grooves indicated at 85 in FIGS. 6 to 8, and it is shifted along the grooves until it is expelled from the outer ends thereof into the adjacent rotor pocket or pockets 62. There is a scissors-like action between groove edges 80 and 82 which forces the particulate material outwardly along the grooves, this action being particularly evident in FIGS. 7 and 8, the latter figure showing edge 80 just prior to final clearance from edge 82.

FIGS. 5 to 8 show only one scraper groove moving over groove 20, but it will be realized that with a plurality of grooves 23, they will practically always be one or more of these grooves travelling over groove 20.

While both plates 12 and 14 have been shown as recessed in the end of rotor unit 45, it will be understood that plate 12 may be completely or partially recessed in inner surface 76 of end wall 48. Furthermore, instead of grooves 20 and 23 being formed in separate places 12 and 14, these grooves may be formed in the inner surface of end wall 48 and the adjacent end of hub 60 so that said end wall and hub are the relatively rotatable members of the scraper apparatus.

What is claimed is:

1. Scraper apparatus for equipment liable to have foreign matter lodge between relatively rotatable elements thereof, comprising first and second members having adjacent interfitting surfaces pressed against each other, said first member being rotatable relative to the second member about an axis perpendicular to said members, said first member having a groove in said surface thereof extending to an outer edge of the first member, said second member having a groove in said surface thereof extending outwardly relative to said axis, one of said grooves being inclined relative to the other of said grooves, whereby foreign material tending to lodge between said adjacent surfaces of the members during rotation of the first member is scraped into said grooves and forced therealong outwardly in a general radial direction to be discharged therefrom at the outer edge of the first member.

2. Scraper apparatus as claimed in claim 1 in which said other of the grooves is inclined relative to said one of the grooves and in the opposite direction to the incline of the latter groove.

3. Scraper apparatus as claimed in claim 2 in which each groove extends substantially tangentially relative to said axis of rotation.

4. Scraper apparatus as claimed in claim 1 in which the groove of the first member has a closed inner end ahead of the opposite end of said groove in the direction of rotation of said first member.

5. Scraper apparatus as claimed in claim 1 in which each groove has an edge along one side thereof extending to said outer edge of its respective member, whereby during rotation of the first member, said edge of the groove in the first member first crosses said edge of the groove in the second member near an inner end of the latter groove and slides along the latter edge to an outer end of said second member groove.

6. Scraper apparatus as claimed in claim 1 in which there are a plurality of similar, circumferentially spaced grooves in the first member.

7. Scraper apparatus as claimed in claim 1 in which said members are plates, the respective grooves of said plates are slots therein opening out from edges thereof.

8. Scraper apparatus in a rotary air-lock feeder having a rotor unit mounted in a cylindrical housing for rotation around a longitudinal axis thereof, said unit having a hub and blades radiating therefrom forming radial pockets therebetween, end edges of said blades slidably engaging end walls of the housing, and said hub having at least one effective end slidably engaging an adjacent effective wall section, characterized by a groove in said effective end of the hub extending away from said axis to the periphery of the hub and opening into one of the pockets of the rotor unit, and a groove in the adjacent effective wall section extending away from said axis and approximately the same length as the first-mentioned groove, one of said grooves being inclined relative to the other of said grooves, whereby foreign material tending to lodge between the effective hub end and the effective wall section during rotation of the rotor unit is scraped into said grooves and forced therealong outwardly in a general radial direction and discharged into said one rotor pocket.

9. Scraper apparatus as claimed in claim 8 in which said other of the grooves is inclined relative to said one of the grooves and in the opposite direction to the incline of the latter groove.

10. Scraper apparatus as claimed in claim 9 in which each groove extends substantially tangentially relative to said axis of rotation.

11. Scraper apparatus as claimed in claim 8 in which the groove of the hub end has a closed inner end ahead of the opposite end of said groove in the direction of rotation of the hub.

12. Scraper apparatus as claimed in claim 8 in which each groove has an edge along one side and extending the length thereof, whereby during rotation of the hub, said edge of the groove in the hub first crosses said edge of the groove in the wall section near an inner end of the latter groove and slides along the latter edge to an outer end thereof.

13. Scraper apparatus as claimed in claim 8 in which there are a plurality of similar, circumferentially spaced grooves in the hub end.

14. Scraper apparatus as claimed in claim 8 in which the effective end of the hub and the effective wall section are plates, and the respective grooves of said plates are slots therein opening out from edges thereof.

References Cited
UNITED STATES PATENTS

| | | | |
|---|---|---|---|
| 2,350,448 | 6/1944 | Collins | 277—133 |
| 2,750,233 | 6/1956 | Yellott | 302—49 |
| 3,421,768 | 1/1969 | Ludwig | 277—25 |

ANDRES H. NIELSEN, Primary Examiner

U.S. Cl. X.R.

277—25